United States Patent
Cox et al.

(10) Patent No.: US 8,220,740 B2
(45) Date of Patent: Jul. 17, 2012

(54) MOTOR FOR DRIVING AIRCRAFT, LOCATED ADJACENT TO UNDERCARRIAGE WHEEL

(75) Inventors: Isaiah Watas Cox, Baltimore, MD (US); Hans Juergen Walitzki, Portland, OR (US); Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 737 days.

(21) Appl. No.: 12/291,257

(22) Filed: Nov. 6, 2008

(65) Prior Publication Data

US 2009/0114765 A1    May 7, 2009

Related U.S. Application Data

(60) Provisional application No. 61/002,079, filed on Nov. 6, 2007.

(51) Int. Cl.
*B64C 25/50* (2006.01)
(52) U.S. Cl. .................... 244/103 R; 244/100 R
(58) Field of Classification Search .......... 244/50, 244/100 R, 102 R, 103 S, 103 R; 180/65.51, 180/904; 301/6.1, 6.2, 6.5
See application file for complete search history.

(56) References Cited

U.S. PATENT DOCUMENTS

| 3,711,043 | A | 1/1973 | Cameron-Johnson |
| 3,977,631 | A | 8/1976 | Jenny |
| 6,657,334 | B1 | 12/2003 | Edelson |
| 6,831,430 | B2 | 12/2004 | Edelson |
| 2006/0065779 | A1* | 3/2006 | McCoskey et al. ....... 244/100 R |
| 2006/0273686 | A1 | 12/2006 | Edelson |

FOREIGN PATENT DOCUMENTS

| EP | 0756556 B1 | 2/1997 |
| GB | 2210833 A * | 6/1989 |
| WO | 2005035358 A2 | 4/2005 |
| WO | 2005112584 A2 | 12/2005 |
| WO | 2006002207 A2 | 1/2006 |
| WO | 2006065988 A2 | 6/2006 |
| WO | 2006113121 A1 | 10/2006 |
| WO | 2007103266 A2 | 9/2007 |

* cited by examiner

*Primary Examiner* — Timothy D Collins
*Assistant Examiner* — Nicholas McFall

(57) ABSTRACT

The invention disclosed is a self-propelled aircraft undercarriage for driving an aircraft on the ground, comprising: an axle; a strut supporting said axle; at least one wheel rotatably mounted on said axle; and drive means for driving said at least one wheel; characterized in that said drive means is disk shaped and is external to said wheel. In one embodiment of the invention, said drive means is mounted on said axle between said strut and said wheel. In a second embodiment, said drive means is mounted on said axle, on the side of said wheel furthest from said strut.

17 Claims, 3 Drawing Sheets

MOTOR FOR DRIVING AIRCRAFT, LOCATED ADJACENT TO UNDERCARRIAGE WHEEL

CROSS-REFERENCE TO RELATED APPLICATIONS

This application claims the benefit of Provisional Patent Application No. 61/002,079, filed Nov. 6, 2007.

BACKGROUND OF THE INVENTION

The use of separate motors to move aircraft on the ground is helpful since it avoids using the aircraft turbines or a separate tug to move the aircraft.

U.S. Pat. No. 3,711,043 to Cameron-Johnson discloses an aircraft drive wheel having a fluid-pressure-operated motor housed within the wheel and two planetary gear stages housed in a gear box outboard of the motor, the final drive being transmitted from a ring gear of the second gear stage, which is inboard of the first stage, to the wheel through an output drive quill coupled, through a disc-type clutch if desired, to a flanged final drive member surrounding the inner end of the gear box and bolted to the wheel.

U.S. Pat. No. 3,977,631 to Jenny discloses a wheel drive motor selectively coupled to an aircraft wheel through a rotatably mounted aircraft brake assembly in order to drive the wheels of an aircraft. The normally non-rotating stator portion of a conventional aircraft brake assembly is rotatably mounted about the wheel axle and is rotatably driven through a planetary gear system by the wheel drive motor.

A solution disclosed in PCT application WO2005/035358 discloses a mesh connected high phase order induction motor, situated in close proximity to, and preferably within, the nosegear. The mesh connection enables variable inductance so that the machine has a range of speed/torque profiles available.

European Patent No. 0 756 556 B1 to Giovanardi and Centofante discloses an aircraft having wheel driving means associated with at least one of the wheels of the landing gear. A motor powered by the auxiliary power unit of the aircraft is used to drive the wheels of the landing gear. The assembly comprises an electric or hydraulic motor in operative connection with a differential gear assembly, each wheel being mounted on an axle in forward operative connection with a respective half-shaft of the differential gear through a free wheel mechanism.

Motors providing high torque at low speeds are known in the art. Specifically, such motors are known that are designed for the purpose of propelling aircraft on the ground.

WO05112584 to Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either role. The stator comprises at least three different electrical phases supplied with electrical power by an inverter. The rotor has a standard winding configuration, and the rotor support permits axial rotation.

WO2006002207 to Edelson discloses a motor-generator machine comprising a high phase order AC machine with short pitch winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection. The disclosure is further directed to selection of a winding pitch that yields a different chording factor for different harmonics. The aim is to select a chording factor that is optimal for the desired harmonics.

Disclosed in WO2006/065988 to Edelson is a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a preferred embodiment, the coils are connected to be able to operate with 2 poles, or four poles, under H=1 where H is the harmonic order of the drive waveform. The coils may be connected together in series, parallel, or anti-parallel.

In U.S. patent application Ser. No. 11/403,402, filed Apr. 12, 2006, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle. Such a machine may be located inside a vehicle drive wheel, and allows a drive motor to provide the necessary torque with reasonable system mass.

International Appl. No. PCT/US2006/12483, filed Apr. 5, 2006, discloses a motor-generator machine comprising an induction and switched reluctance motor designed to operate as a reluctance machine at low speeds and an inductance machine at high speeds. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

PCT application no. WO 2007/103266-A2 to Edelson, filed 2 Mar. 2007, discloses a motor comprising: a fixed member comprising a magnetic core and magnetic windings, having an internal cavity; a driven member inside said fixed member, comprising magnetically conductive materials; said driven member being situated inside, and able to move within, said fixed member, wherein magnetic normal force is induced in said fixed member periodically, whereby said driven member is periodically moved by magnetic force with respect to said fixed member, whereby periodic motion is produced.

BRIEF SUMMARY OF THE INVENTION

The invention disclosed is a self-propelled aircraft undercarriage for driving an aircraft on the ground, comprising: an axle; a strut supporting said axle; at least one wheel rotatably mounted on said axle; and drive means for driving said at least one wheel; characterized in that said drive means is disk shaped and is external to said wheel.

In one embodiment of the invention, said drive means is mounted on said axle between said strut and said wheel. In a second embodiment, said drive means is mounted on said axle, on the side of said wheel furthest from said strut.

BRIEF DESCRIPTION OF THE SEVERAL VIEWS OF THE DRAWING

The invention will now be described with reference to the accompanying drawings, in which.

DETAILED DESCRIPTION OF THE INVENTION

Figure 1:
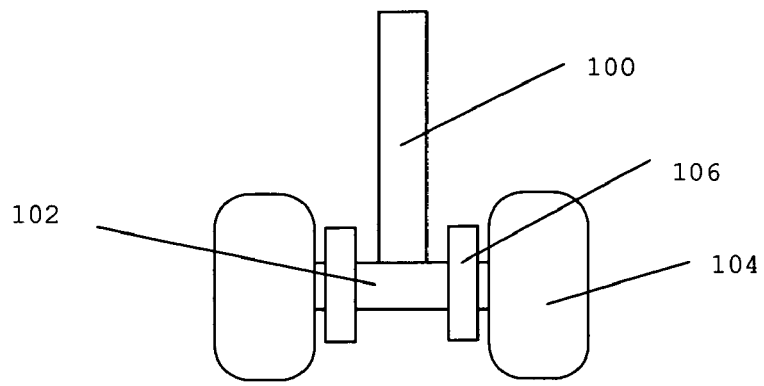
FIG. 1 is a general view of the first embodiment of the invention.

In a first embodiment of the invention, shown in FIG. 1, a self-propelled aircraft undercarriage for driving an aircraft on the ground, is disclosed, comprising: an axle 102; a strut 100 supporting said axle; two wheels 104 rotatably mounted on said axle; and a drive means 106 for driving each said wheel. Said drive means is disk shaped and is external to said wheel. Said drive means is mounted on said axle between said strut and said wheel as shown in the figure.

Said strut is a supporting strut as is known in the art of aircraft undercarriages. It may be retractable, telescopically or otherwise, and may be made of a metal, metal alloy or any other suitable material.

Said axle and said wheel are also as known in the art of aircraft undercarriages and may be of any suitable construction and material. Said wheel may comprise a tire which is as known in the art and may be of any suitable construction and material.

Said drive means is preferably a high phase order electric induction motor. Said drive means may also be any other form of electric motor including but not limited to an electric synchronous or asynchronous AC induction motor, permanent magnet brushless DC motor or switched reluctance motor. In either case, the electric motor can be designed as radial field or as axial field motor. Alternatively, and within the scope of this invention, the motor can also be a hydraulic pump/motor assembly or a pneumatic motor, driven by onboard hydraulic or pneumatic systems, or may be any drive means capable of driving an aircraft on the ground. Preferably, said drive means is one of the motors described in the background section of this patent. These are able to provide high torque at low speeds and as such are suitable for aircraft undercarriage wheels.

Figure 3:
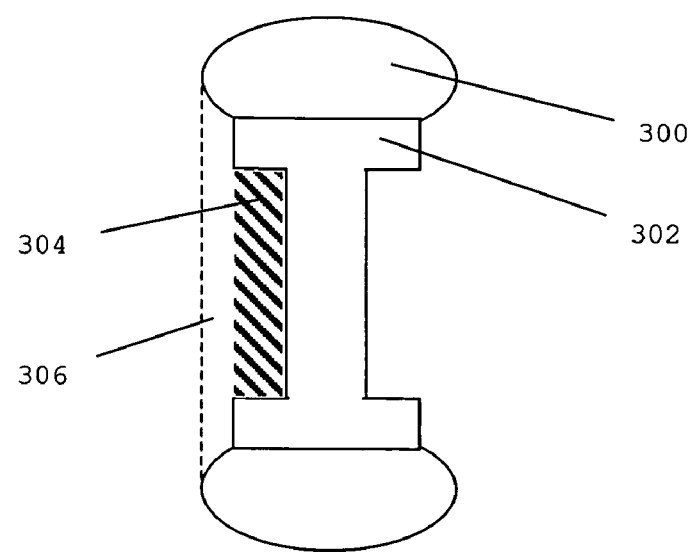
FIG. 3 is a cross section of a wheel depicting available cavities for the drive means to occupy.

The length of said drive means is preferably less than its diameter since this is a shape which will provide less wind resistance during takeoff and landing. Preferably, said drive means is less than 3 inches thick and, if on the strut side of the wheel, is substantially disk shaped with a cut-out in the center to allow mounting over the axle, that is, bagel-shaped. 'Substantially' in this case means that while the motor may have indents, protrusions, curves, or other non-uniformities, its overall shape is similar to a disk. Said drive means may be a flat or a curved disk, or teardrop shape and may be shaped to fit the profile of the side of the wheel, or shaped to fit any component of the undercarriage to which it is adjacent. This will ensure that the minimum of space is occupied by the drive means. Said cut-out may be the size and shape of a cross section of the axle, the hub, or any size or may not be present, that is, the motor may be disk-shaped with no cut-out. An advantage of being less than 3 inches thick is that the drive means can fit inside the wheel cavity of most wheels as shown in FIG. 3. In the figure, wheel 302 has cavity A 304 which the drive means could occupy. Furthermore, since tire 300 bulges outwards beyond the thickness of the wheel, cavity B 306 is created, which is a further volume, which the drive means could also occupy. Thus there is the total cavity A+B available in which to locate the drive means. This is the preferable shape and location since it occupies no extra space in, and will be able to retract into, the wheel bay during flight with little or no alteration to the bay. This design also provides the maximum surface area contact of the wheel with the drive means, which is helpful for the clutch designs described below.

An advantage of the present invention is that, since the drive means is external to the wheel as opposed to being an integral part of the structural design, the drive means is not load bearing, that is, it neither supports the weight of the aircraft during taxi nor bears the impact of the aircraft landing. The drive means can therefore be thinner and made of weaker materials, and is therefore cheaper, lighter, and simpler to construct. Alternatively, this means that a stronger drive means can be constructed within the allowed weight limit.

A further advantage of the drive means not being load bearing is that there is a reduced certification standard from regulatory authorities in order to install the drive means on the aircraft.

A yet further advantage is that, since the drive means is not load bearing, it can be located in any undercarriage wheel. In particular, it can be located in the main gear or all main gears of an aircraft, which bear a much greater weight and are therefore not suitable for an in-wheel drive means. Since the main gears bear more weight, they have much more traction with the tarmac surface, which enables better control and driving of the aircraft using the drive means. However, the invention can also be in an aircraft nosewheel.

A yet further advantage is that, since the drive means is not load bearing, there are fewer problems due to heating of the drive means.

A yet further advantage is that the invention can be installed in an existing aircraft without the need to replace or modify the undercarriage. The drive means can simply be installed on the axle and connected to either side of the wheel.

A yet further advantage is that heat can be dissipated through exposure to air more easily than for an in-wheel drive means, as well as by conduction to and through the wheel, thus using the wheel as a heat sink.

In one arrangement the rotor disk is mounted to the wheel (using the existing or modified bolts) so that the existing wheel bearings also double-function as rotor bearings. That is, since the wheel and rotor are non-rotationally attached, and the wheel has bearings, these bearings automatically act as bearings for the rotor also. This greatly simplifies the design of the motor and reduces the weight of the motor. Alternatively, said undercarriage may further comprise a mechanical coupling between said wheel and said drive means for connecting said wheel to said drive means. Said mechanical coupling is preferably able to be engaged or disengaged, but may also be a permanent coupling.

Said coupling may comprise teeth on said drive means which interlock with teeth on said wheel to engage said wheel with said drive means. Means may be provided for moving said drive means towards said wheel, to engage said teeth, when the drive means is required to be engaged, and for moving said drive means away from said wheel when the drive means is required to be disengaged. Said means may be hydraulic, or use a linear motor, for example and without limitation. The component which moves may be said drive means or said wheel.

Alternatively, said coupling may comprise a magnetorheological fluid (MRF) clutch, which is engaged or disengaged automatically with the motor current.

Alternatively, said coupling may be mounted radially outside the rotor such that the centrifugal force from the motor's rotation will automatically engage the motor to the wheel and move the wheel, whereas the wheels' rotation without the motor's rotation (during take-off and landing of the aircraft) will keep the coupling disengaged.

Alternatively, said coupling may comprise a friction pad such as that found in clutches or friction brakes, on said drive means, and a further friction pad on said wheel. Means may be provided, which means may be hydraulic, for moving said drive means towards and away from said wheel, causing the friction pads to meet to engage the motor and to separate to disengage the motor respectively. The component which moves may be said drive means or said wheel. An advantage of this clutch is that no separate component is required for the clutch, which reduces cost and weight of the invention.

Said clutch may further comprise means for automatically engaging or disengaging the drive means from the wheel when a predetermined speed is reached, for example, when the speed of the wheel equals the speed of the drive means. Preferably, the clutch is anticipated to only engage or disengage when the speed of the wheel and the drive means are matched, so as to limit wear on the clutch mechanism.

An advantage of the invention having a clutch is that the wheel need only be engaged after landing. Upon descent and landing, the wheel can be disengaged from the motor and there is therefore no requirement to pre-spin the drive means (and therefore the wheel) up to landing speed. The drive means may remain totally inert in all parts of flight. This increases safety and simplicity.

Said drive means may further comprise means for modifying or adapting the speed and/or torque of the motor with respect to the wheel. This includes the use of gears or gear trains, torque converters, planetary gear transmissions, cycloidal reducers and other known speed and torque transmission means. Said gear, gear train or other transmission means may be separate from or integral to the motor. For example and without limitation, motor parts may have gear teeth to make them mesh with other gears.

Figure 2:
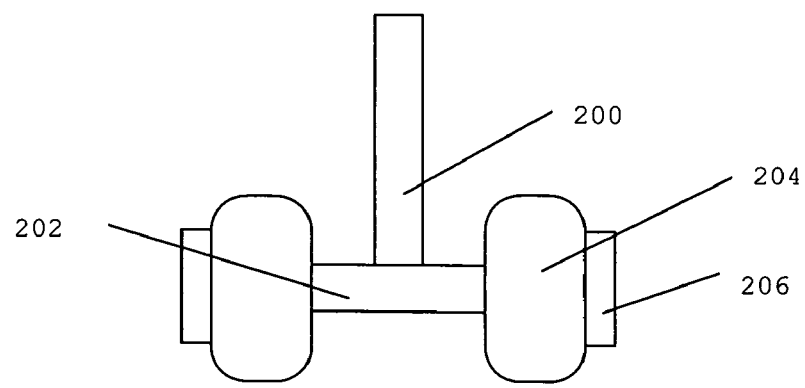
FIG. 2 is a general view of the second embodiment of the invention.

In a second embodiment of the invention, shown in FIG. 2, the undercarriage has two wheels 204 mounted on axle 202 supported by strut 200. Drive means 206 are mounted on said axle, on the side of each said wheel furthest from said strut, as shown in the figure. An advantage of this arrangement over the first embodiment is that heat can be dissipated more easily from this side of the wheel to the surrounding atmosphere. Said drive means may be able to slide on and off said axle and may have a release mechanism for releasing the drive means from the axle in order to slide off the drive means. This facilitates tire changing. The release mechanism may be any known in the art. All other details are as in the first embodiment.

Figure 4:
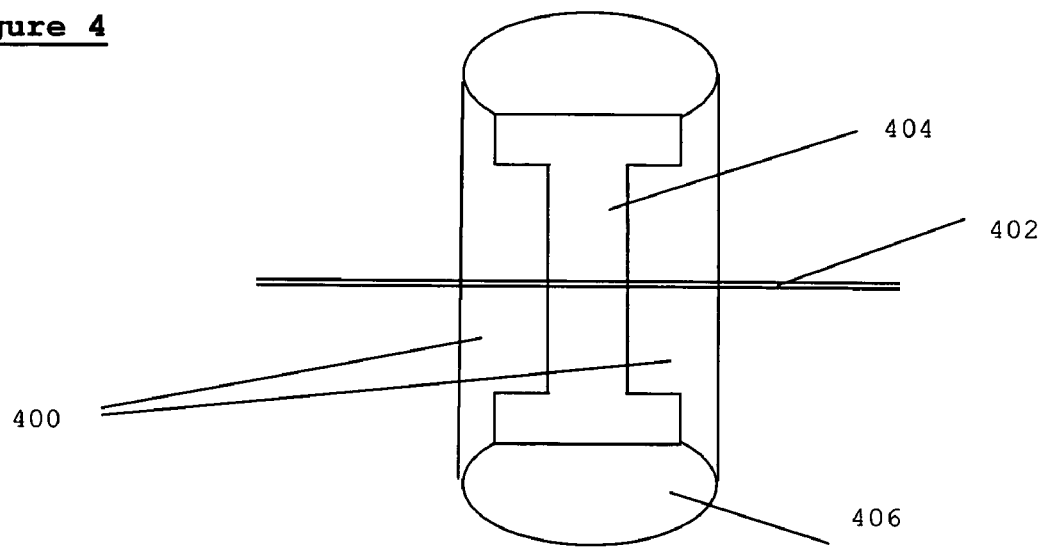
FIG. 4 is a general view of the third embodiment of the invention.

In a third embodiment of the invention, shown in FIG. 4, two drive means 400 are mounted on the axle 402 for each wheel 404, one drive means being located on each side of the wheel. (Thus for an undercarriage arrangement consisting of two wheels, four drive means would be mounted). Tire 406 is mounted on wheel 404. The two drive means may be able to move towards and away from the wheel as required for engaging and disengaging, and in their position closest to the wheel may contact and clamp the wheel, acting as caliper brakes. This is preferably achieved using linear motor activation or may be achieved using hydraulics. Power may be fed to the drive means closest to the strut directly from the strut, and to that furthest from the strut through the axle. An advantage of this embodiment is that the maximum volume within the wheel space is occupied, without taking up extra space outside of the wheel. Thus stronger motors, able to provide more torque, can be fitted. Furthermore, the surface area of contact of the drive means with the wheel is maximized to allow more efficient coupling. Furthermore, forces from the drive means are distributed over both sides of the wheel, reducing wheel fatigue and sharing stresses evenly throughout the wheel.

Figure 5A:
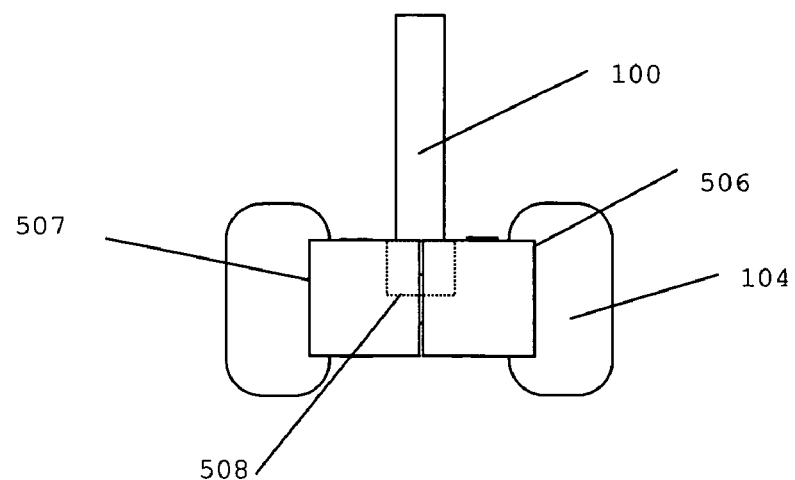
FIG. 5a is a cross sectional view of the fourth embodiment of the invention, viewed from the front of an aircraft.
Figure 5B:
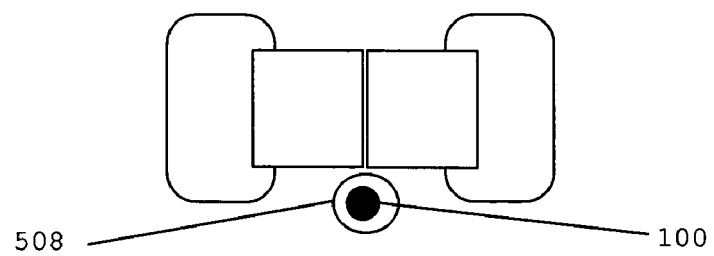
FIG. 5b is a cross sectional view of the fourth embodiment of the invention viewed from above.

In a fourth embodiment, shown in FIGS. 5a and 5b, two drive means 506 and 507 are mounted on the axle, one for each wheel 104, one drive means being located on each side of the strut 100. Each drive means has a cut-out 508 on its upper part to allow for the vertical part of the strut 100 to freely move (in vertical direction) to operate the wheel in the same manner as with no drive means installed. A suitable drive means, which allows this cut-out design is preferably an axial flux electric motor or a hydraulic or pneumatic motor. All other features are as in the first embodiment.

The invention claimed is:

1. A self-propelled aircraft undercarriage for driving an aircraft on the ground, said undercarriage comprising:
    a strut supporting an axle with one or more wheels, each wheel being rotatably mounted on said axle;
    a tire which bulges mounted on said wheel to bulge outwardly of a greatest axial dimension of said wheel; and
    drive means mounted adjacent to said wheel for driving said aircraft on the ground;
    wherein said wheel and said tire are configured to define a first cavity externally adjacent to said wheel and a second cavity between said first cavity and said tire bulge, and said drive means is sized and shaped to be mounted completely within a space formed by said first cavity, a space formed by said second cavity, or a space formed by both said first cavity and said second cavity so that said drive means occupies no extra space in and requires little or no alteration to an aircraft wheel bay; and coupling between said drive means and said wheel, wherein said coupling automatically and releasably connects said drive means and said wheel when said wheel is mounted.

2. The undercarriage of claim 1, wherein said drive means is configured to have a shape selected from the list of shapes consisting of a flat disk, a curved disk, bagel-shaped, teardrop shaped, shaped to fit the profile of the wheel, shaped to fit the profile of the bulge of the tire, shaped to fit the profile of an adjacent component, and shaped to occupy some of the accessible space provided by the configuration of the wheel and the length of the drive means is less than its diameter.

3. The undercarriage of claim 1, wherein said wheel acts as a heat sink.

4. The undercarriage of claim 1, further comprising wherein said coupling comprises at least one mechanical coupling between said wheel and said drive means.

5. The undercarriage of claim 4 wherein said mechanical coupling is selected from the list consisting of a clutch, a gear, and a gear train.

6. The undercarriage of claim 5, wherein said gear or gear train is integral to said motor drive means.

7. The undercarriage of claim 5 wherein said clutch comprises at least one clutch selected from the list comprising:
   teeth on said wheel and teeth on said drive means, said teeth interlocking to engage said motor drive means with said wheel;
   magneto rheological fluid to engage said drive means with said wheel;
   a friction pad on said wheel and a friction pad on said drive means, said friction pads meeting to engage said drive means with said wheel; and
   an element connected to the outside of a rotor of said drive means, which engages with the wheel driven by centrifugal force originating from the rotor's rotational speed and disengages when the rotor is not turning regardless of the wheel rotation.

8. The undercarriage of claim 5 wherein said clutch automatically disengages when a speed of said wheel equals a predetermined speed.

9. The undercarriage of claim 5 wherein said clutch automatically engages when the motor drive means is rotating and disengages when only the wheel is rotating.

10. The undercarriage of claim 5 wherein said clutch engages and or disengages when a speed of the drive means and a speed of the wheel are substantially identical, whereby the clutch is simplified and has reduced wear in operation.

11. The undercarriage of claim 1, wherein said drive means is one a motor selected from the list of motors comprising: electric synchronous AC induction motors; electric asynchronous AC induction motors; high phase order electric induction motors; permanent magnet brushless DC motors; switched reluctance electric motors; variable reluctance electric motors; hydraulic pump/motors; and pneumatic motors.

12. The undercarriage of claim 1, wherein said drive means includes means for adapting motor speed and torque to values required for moving aircraft on the ground and said means for adapting motor speed and torque is at least one selected from the list comprising: gear converters, torque converters, planetary gear transmissions, and cycloidal reducers.

13. The undercarriage of claim 1, further including a release mechanism releasably connecting said drive means and said axle, whereby said drive means is able to slide on and off said axle.

14. The undercarriage of claim 1, wherein said undercarriage is selected from the list comprising: an aircraft main landing gear; or an aircraft nosewheel landing gear.

15. The undercarriage of claim 1, wherein said drive means includes a rotor and said rotor is mounted to said wheel, wherein bearings of said wheel also provide a bearing function for said rotor, thereby reducing weight of said drive means.

16. The self-propelled undercarriage of claim 2, wherein said drive means is configured to occupy minimal space and has a thickness of less than 3 inches, whereby said drive means can fit inside a wheel cavity of most aircraft wheels.

17. The self-propelled undercarriage of claim 1, further comprising a pair of wheels rotatably mounted on said axle on opposite sides of said strut, a tire mounted on each of said wheels, and a substantially disk shaped drive means mounted on each wheel in the space formed by said first cavity, said second cavity, or both said first and said second cavity.

* * * * *